Figure 1:
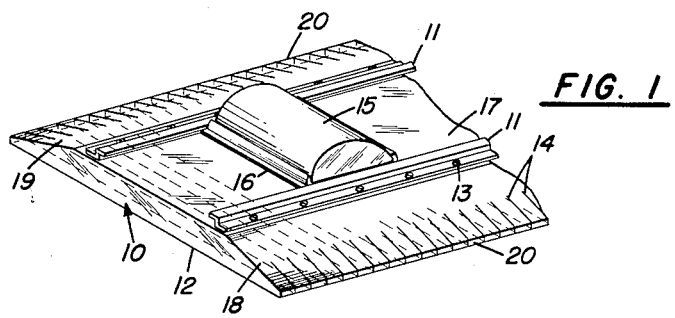

Feb. 28, 1956     C. G. COLEMAN, JR     2,736,097
MAGNIFYING MEASURING SCALE
Filed Feb. 13, 1953

INVENTOR
CHARLES G. COLEMAN, JR.

BY

ATTORNEYS

United States Patent Office 2,736,097
Patented Feb. 28, 1956

2,736,097
MAGNIFYING MEASURING SCALE

Charles G. Coleman, Jr., Suitland, Md.

Application February 13, 1953, Serial No. 336,895

2 Claims. (Cl. 33—107)

(Granted under Title 35, U. S. Code (1952), sec. 266)

The invention described herein may be manufactured and used by or for the Government of the United States of America for governmental purposes without the payment of any royalties thereon or therefor.

The present invention relates to measuring scales, and more particularly to a scale provided with a magnifying device to facilitate accurate measuring.

The scale is designed for use where precise measurements between points on a flat surface must be made under magnification. It has particular application in measurements made for interpretation or photogrammetric use on aerial or ground photography. The scale is, of course, very useful for drafting, and for reading or preparing plans, maps or blue prints.

At present, measurements on photographs have been made using a standard wooden, metal, or plastic scale graduated in millimeters or thousandths of a foot. In order to locate the graduation precisely over the detail to be measured, a separate magnifying glass is usually held over the scale. Often one lens of a pocket stereoscope is used for this purpose. For very short measurements of the order of one half inch or less on photographs, frequent use is made of one of several types of "tube magnifier," which combines a magnifying element with a fixed scale etched on plastic or glass. However, this scale cannot be used to measure distances greater than the effective diameter of the magnifying lens. The proposed scale is not expected to entirely replace such tube magnifiers for small dimension measurement. The instrument of the present application has been conceived to replace the ordinary wooden, plastic, and metal scales which are now being used without magnification for the fine measurements required in map or plan reading and for other flat surface measurement.

Use of a separate magnifying glass with the conventional scale results in inefficiency and inaccuracy. Inefficiency arises due to the necessity of adjusting two separate pieces of equipment, namely, the scale and the magnifier. Furthermore, inaccuracy results due to the unavoidable parallax caused by the relative position of the scale graduations, the magnifier and the observer's eye. The alternative of using no magnification means to make precise measurements produces the obvious results of eye strain and less-than-accurate measurements.

It is, therefore, an object of this invention to provide a measuring scale which will enable precise measurements by means of magnification of the graduated scale.

It is another object of this invention to provide a measuring scale with magnifying means mounted thereon which will avoid parallax.

Another object of this invention is the provision of a transparent scale having graduations on its under surface and having magnifying means mounted thereon.

Still another object of this invention is the provision of a measuring scale which will be accurate and provide for efficient handling, and yet inexpensive to manufacture.

A still further object of this invention is to provide an accurate measuring scale, having magnifying means mounted thereon which will be simple, rugged and durable.

Still another object of this invention is the provision of a precise measuring scale having magnifying means mounted thereon which may be used for measuring with or without magnification.

Figure 2:
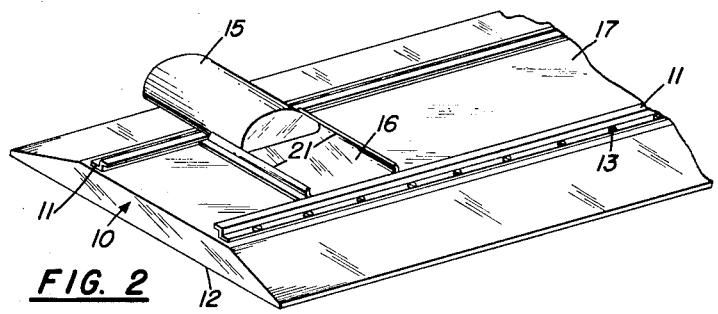
Figure 3:
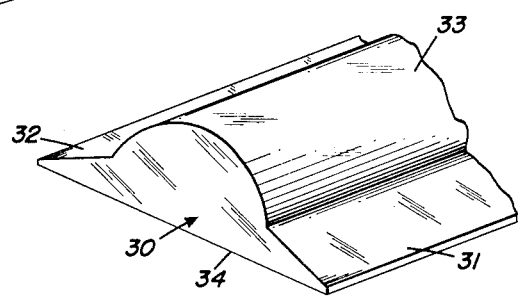
Figure 4:
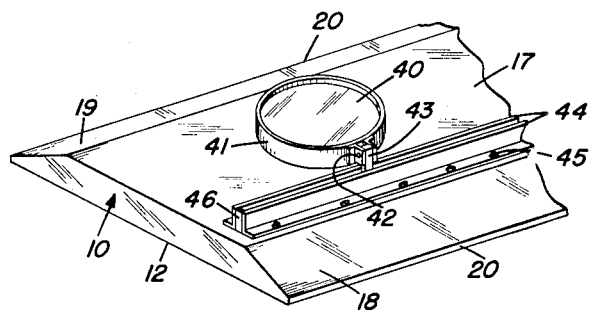

Other objects and advantages of the present invention will be apparent to those skilled in the art to which this invention relates from the following description of the preferred embodiments thereof, described with reference to the accompanying drawing forming a part of this specification, in which similar reference characters designate corresponding parts throughout the several views and in which Fig. 1 is a perspective view of one embodiment of this invention, Fig. 2 is another view of the embodiment shown in Fig. 1, wherein the magnifying means is shown in an alternative position, Fig. 3 is a perspective view of another form of this invention, and Fig. 4 is a perspective view of still another form of this invention.

Referring now to Figs. 1 and 2 of the drawing, 10 denotes a scale constructed of transparent material. The material used may be either plastic, glass, or other suitable material, although the use of a plastic provides a more durable, and no less accurate scale than other of the known materials. The scale 10 is provided with two beveled surfaces 18 and 19 and two straight edges 20 to facilitate measurement in the usual manner. The scale 10 is also provided with a flat bottom surface 12 and a flat slide surface 17 on the top portion of the scale. Mounted on the slide surface 17 is a pair of parallel spaced guideways 11 each of which has a flange extending towards the other guideway, and which are secured by means of screws 13. The guideways 11 may be made of any suitable material, and are preferably transparent. A magnifier 15 is mounted on the scale 10 for sliding motions in two directions. The magnifying means 15 is mounted on a slide 16 between the spaced parallel guideways of the slide. The slide 16 is arranged, a shown, between the guideways 11 on the scale 10 and is arranged for longitudinal movement along the length of the scale 10 under the flanges of the guideways 11. In a similar manner, the magnifier moves transversely between the guideways 21, as shown in Fig. 2. The scale 10 is provided with graduation markings 14 which are placed on the beveled edges 18 and 19 and across the lower surface 12. Since the scale 10 is transparent, the graduations 14 on the surface of the beveled portions 18 and 19, and on the bottom surface of the scale may be read through the movable magnifier 15.

The construction of the scale 10 should be such as to provide a strong, rigid and durable instrument. Several suitable methods of construction are illustrated in the United States Patent to Little, numbered 2,182,027. The details of construction of the scale, however, form no part of the present invention.

In an alternative embodiment of the species disclosed in Figs. 1 and 2, it is possible, and in some instances preferred, to construct the scale 10 and the guideways 11 as one integral molded unit.

Although it has not been illustrated it is clear that stops may be provided on the guideways 21 and 11 to limit the motion of the slide 15 in both the longitudinal and transverse directions.

A second embodiment of this invention is illustrated in Fig. 3. In this embodiment, the entire instrument is constructed so that the scale and magnifier means are integral. In this case, 30 represents a scale similar to that shown in Fig. 1. Graduations (not shown) are placed on the beveled edges 31 and 32, and along the flat bottom surface 34. A semi-cylindrical magnifier 33 is integral with the scale 30 and runs the entire length of the scale. The material used in this embodiment is entirely transparent so that the graduations on the bottom surface may be read without distortion through the magnifier 33.

It is to be understood, of course, that it is within the spirit and the scope of the invention of the species shown in Fig. 3, that the scale and magnifying means may be separate pieces which may be cemented or otherwise fixed together. The embodiment of this invention as shown in Fig. 3, however, is preferred, since the cost of construction may be greatly reduced by molding the instrument in one integral piece.

A third embodiment of this invention is illustrated in Fig. 4 of the drawing. The structure of the scale 10 of Fig. 4 is identical with that shown in Fig. 1. The slide 10 has two beveled edges 18 and 19, a flat bottom surface 12 and a flat upper surface 17. The scale is made of a transparent material and is calibrated (not shown in Fig. 4) as shown in Fig. 1. In the embodiment of Fig. 4, however, the magnifier 40 is mounted within a frame 41 which is pivoted at 42 to a slide member 43. The slide member 43 is movable along the length of the scale within the guideways 44. The guideways may be secured as shown by means of screws 45 on one side of the slide adjacent one of the beveled edges.

With this arrangement the magnifier may be moved along the length of the scale to enable reading of the calibrations along the scale, and the magnifier may be rotated around the pivot 42 to move it over the graduations on the adjacent beveled edge. Although it has not beeen shown, it is to be understood that suitable stop means are provided on the slide member 43 so that the lens of the magnifier 40 will be maintained parallel to the bottom surface 12, both when over the slide portion 17 and when over the beveled portion 18. The ends of the guideways 44 may be closed by any suitable means at 46 so as to limit the travel of the magnifier 40.

From the foregoing description of the preferred embodiments of the invention it will be apparent that the objects heretofore enumerated have been accomplished, and that a novel measuring scale has been provided. While the preferred embodiments of the invention have been illustrated and described, I do not wish to be limited to the construction shown which may be varied within the scope of this invention. It is my intention to cover all variations, adaptations, and uses thereof that come within the practice of those skilled in the art to which the invention relates.

What is claimed is:

1. A measuring instrument comprising a transparent member having an upper and a lower surface and having at least one straight edge, first spaced parallel longitudinal guideways on said upper surface, a transparent slide mounted on said upper surface between said guideways for longitudinal motion along said upper surface, second spaced parallel transverse guideways mounted on said transparent slide, magnifying means slidably mounted on said slide between said second guideways, and calibration markings positioned across the entire of said lower surface at right angles to said straight edge.

2. A measuring instrument comprising a transparent member having an upper and a lower surface and having at least one straight edge, first spaced parallel longitudinal guideways on said upper surface, said guideways each having a flange extending toward said other guideway, a transparent slide mounted on said upper surface between said guideways and under said flanges for longitudinal motion along said upper surface, second spaced parallel transverse guideways mounted on said transparent slide, magnifying means slidably mounted on said slide between said second guideways, and calibration markings positioned across the entire lower surface at right angles to said straight edge.

References Cited in the file of this patent

UNITED STATES PATENTS

| 846,006 | Bryson | Mar. 5, 1907 |
| 1,773,899 | Kaler | Aug. 26, 1930 |
| 1,806,422 | Shaen | May 19, 1931 |
| 2,127,711 | Baldauf | Aug. 23, 1938 |
| 2,502,039 | Floyd | Mar. 28, 1950 |
| 2,586,581 | Tschischeck | Feb. 19, 1952 |
| 2,676,511 | Weisse | Apr. 27, 1954 |

FOREIGN PATENTS

| 11,698 | Great Britain | 1884 |
| 244,266 | Great Britain | Dec. 17, 1925 |
| 342,757 | Great Britain | Feb. 5, 1931 |
| 919,388 | France | Nov. 25, 1946 |